…

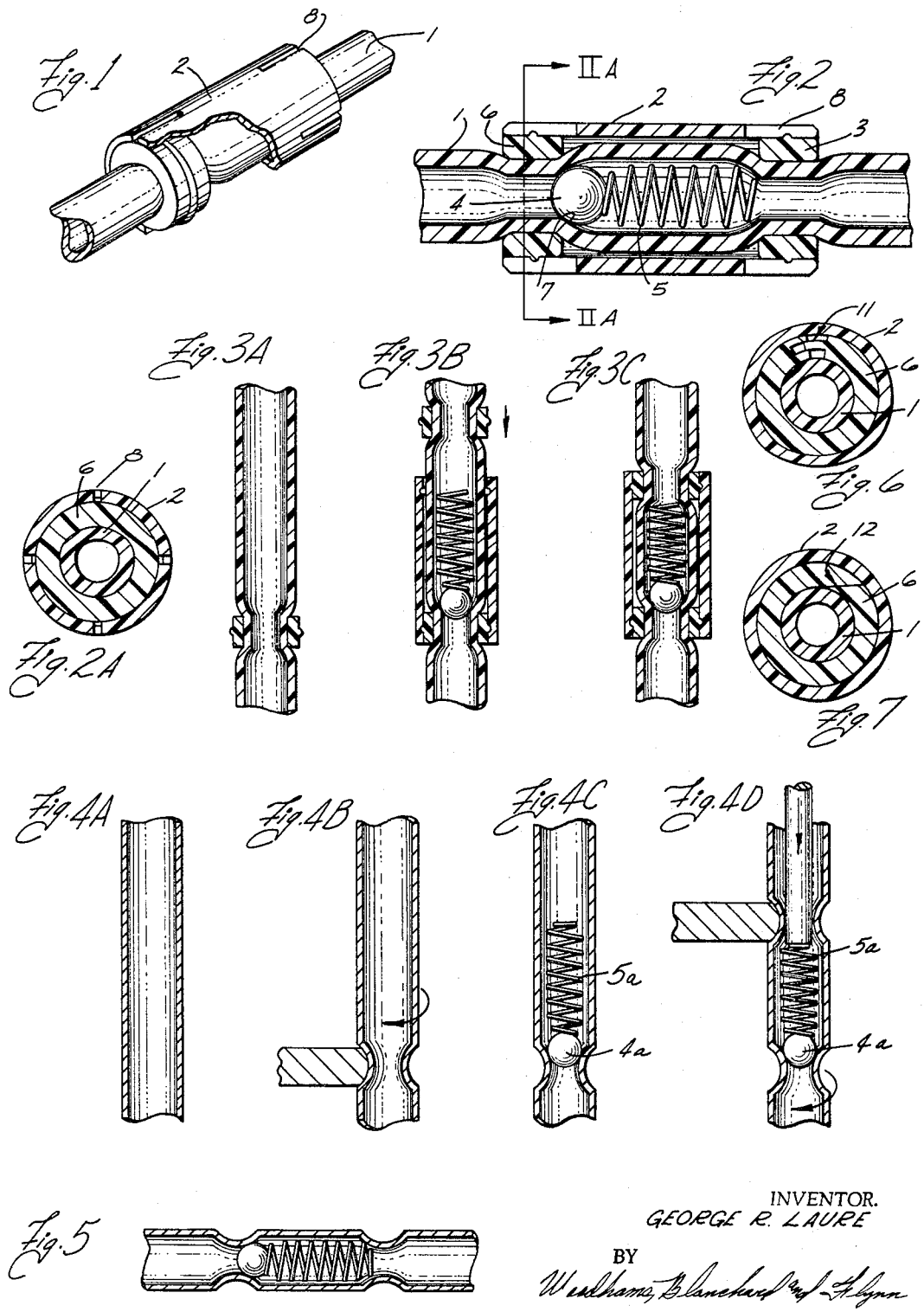

United States Patent Office 3,387,625
Patented June 11, 1968

3,387,625
CHECK VALVE
George R. Laure, Kalamazoo, Mich., assignor to The W-L Molding Company, Kalamazoo, Mich., a corporation of Michigan
Filed June 24, 1965, Ser. No. 466,692
7 Claims. (Cl. 137—543.19)

ABSTRACT OF THE DISCLOSURE

A check valve construction having a ball check valve located between a pair of spaced apart annular constricting rings embracing a deformable tubular member forming deformations on the interior thereof, one of said deformations forming a valve seat for the ball valve member. The deformations are capable of being removed from the tubing and moved axially of the tubing.

---

This invention relates to check valves and particularly to a type thereof adapted for application at any desired point within a shapeable conduit.

Inasmuch as the present invention was devised in connection with flexible tubing the following discussion will be carried out in terms of its use therewith. However, it will be understood that the invention in a broader sense can be applied to a conduit of any material which is capable of being shaped or worked and the following description and claims will be interpreted accordingly.

In the provision of valves, such as check valves, in a variety of fluid handling systems particularly where flexible tubing is being used, it is often desirable to insert, remove or change the position of such valve without breaking the continuity of such tubing. This is advantageous in temporary installations for obvious reasons and it is also advantageous for more permanent installations since it eliminates the necessity, and therefore the cost, of providing connecting and sealing means which would otherwise be necessary between the tubing and a conventional valve. In addition, in accordance with the invention further cost is saved by utilizing the tubing itself as the casing or body portion of the valve.

Accordingly, the objects of the invention include:

(1) To provide a check valve construction which is applicable to tubing without breaking the continuity thereof.

(2) To provide a check valve construction, as aforesaid, which is primarily applicable to flexible tubing but is secondarily applicable to any tubing whose walls can be shaped or worked.

(3) To provide a check valve construction, as aforesaid, applicable to resiliently flexible tubing which can be applied thereto without permanent distortion or alteration of the walls of such tubing.

(4) To provide a check valve construction, as aforesaid, which can at a minimum cost be applied to tubing, which can be changed in position with respect to said tubing after initial application thereto and which can be removed from said tubing.

(5) To provide a check valve construction, as aforesaid, which will utilize the walls of said tubing as the body portion or casing of such valve.

Other objects and purposes of the invention will be apparent to persons acquainted with the apparatus of this general type upon reading the following disclosure and upon inspection of the accompanying drawings.

In the drawings:

FIGURE 1 is an oblique, partially broken view of a valve of my invention applied to a piece of tubing.

FIGURE 2 is a central longitudinal section of my check valve construction as applied to a piece of flexible tubing such as rubber or plastic tubing.

FIGURE 2A is a sectional view along the line IIA—IIA of FIGURE 2.

FIGURES 3A, 3B and 3C illustrate successive states in the manufacture of a valve according to the invention.

FIGURES 4A, 4B, 4C and 4D represent successive stages in the manufacture of a valve embodying the broader principles of my invention as applied to a non-resilient but easily workable tubing material, such as copper tubing.

FIGURE 5 represents a finished valve made according to the steps illustrated in FIGURES 4A-4D.

FIGURES 6 and 7 illustrate by views corresponding to FIGURE 2A two modifications of the invention which are particularly applicable to thick-walled elastomeric tubing.

Referring now to the drawings, there is shown in FIGURE 1 a piece of flexible and resilient tubing 1 made from a suitable material such as rubber or elastomeric plastic into which a valve according to the invention has been placed. A cylindrical shell 2 is telescoped externally of the tubing and moved to the position to be occupied by the valve. The circular clamp ring 3 is telescoped over the tubing and positioned at the end of said shell. Said ring is held by said shell to reduce substantially the diameter of the tubing at a point adjacent the end of said shell, namely, to a diameter approximately one-half that of the normal tubing. The tubing is either now or after the rest of the assembly is completed stretched longitudinally to eliminate any folds or creases which may have appeared under the clamp ring 3 during the manipulation thereof.

The ball constituting the valve unit indicated at 4 is now dropped into the tubing and caused to occupy a position radially within the shell 2. The spring 5 follows the ball 4. The clamp ring 6 is now telescoped over the tubing and within the shell 2 to contract the tubing at the other end of the shell 2 and the valve is completed. Normally the tubing will be longitudinally stretched again to eliminate folds and creases under the clamp ring 6 but this is only to improve the smooth flow of liquid therethrough and is not necessary to the proper operation of the valve. Alternatively, the assembly of the valve may be completed and the tubing then stretched whereby to effect stretching under both clamp rings simultaneously. The valve unit 4 acts against the contracted portion 7 of the tubing, such contracted portion of the tubing constituting the valve seat.

FIGURES 3A, 3B and 3C illustrate the assembly steps above described.

The valve is shifted in position with respect to the tubing merely by sliding the whole assembly longitudinally and again stretching the tube if and to the extent necessary to eliminate folds or creases which occur therein under the clamps.

The valve is removed simply by reversing the application procedure and the tube returns unaltered to its normal condition and shape.

Modifications

While a number of modifications will at once suggest themselves to persons acquainted in this art, a few will be mentioned following and will indicate better the scope of the invention. For example, the shell 2 may be omitted and the clamp rings 3 and 6 are provided as independently mounted rings. A further possible modification is to replace the ball 4 by a valve unit having a cylindrical base and a conical end, the conical end mating with the contracted portion 7 of the tubing.

In the unit above illustrated and described in FIGURES 1-3C, the rings 3 and 6 are solid and a resilient relationship between said rings and the shell is provided by slotting the shell as indicated at 8. However, as illustrated in FIGURES 6 and 7, said rings 3 and 6 may be made circumferentially resilient in any convenient way, such as by providing a tongue and groove as shown at 11 in FIGURE 6 or by scarfing as shown at 12 in FIGURE 7. In such case, the rings may be telescoped over the tubing in a partially or entirely expanded position, contracted onto the tubing at their respective positions of use and then held in contracted condition by a shell 2A of non-resilient construction. While this approach may not provide as smooth an internal surface for the rings 3 and 6 as where same are of unbroken nature and hence may not be fully satisfactory for thin-walled tubing, there will be some advantage in this construction for thick wall tubing inasmuch as it will be easier to slide over the tubing into place in a somewhat expanded condition and any irregularity in either wall of the ring is not likely to effect the smoothness of the valve seat 7 formed in and by the tubing.

A further modification is illustrated in FIGURES 4A–D and FIGURE 5 wherein certain of the broader concepts of the invention are applied to a permanently distortable tube, such as copper tubing. In this form, it is possible to maintain the advantage of eliminating connections at each end of the valve unit and the advantage of utilizing the tubing for the valve casing, but there is lost the advantage above mentioned of being able to move or remove the valve at will with the tubing thereupon automatically returning to its original shape and condition.

In this application of the invention no clamps are used and the tubing is merely reduced in diameter, such as by spinning same (FIGURE 4B), in a conventional manner (or by heating and stretching if glass tubing is used). The ball 4a or other valve unit and spring 5a are then placed therein as shown (FIGURE 4C) and the other end of the valve area is similarly reduced in diameter (FIGURE 4D) to provide the finished valve (FIGURE 5).

It will be apparent that any material may be used for the valve unit 4 providing only it will slide readily with respect to the surface of that portion of the tubing constituting the valve casing and provided further it will seal effectively with respect to the portion of the tubing constituting the valve seat.

Although a particular embodiment of the invention has been described above in detail for illustrative purposes, it will be recognized that variations or modifications of such disclosure, which lie within the scope of the appended claims, are fully contemplated.

The embodiments of the invention in which an exclusive property or privilege is claimed are defined as follows:

1. In a check valve construction, the combination comprising:
   an elongated deformable tubing;
   means defining a deformation in said tubing uniformly diminishing the internal cross sectional area thereof for providing a valve seat, said means being adjustably movable axially of said tubing to adjustably vary the location of said valve seat;
   a valve unit cooperable with said valve seat; and
   limit means opposing opposite movement of said unit, said limit means being movable axially of said tubing to maintain a predetermined spaced relationship with said deformation.

2. The device defined in claim 1, wherein said means defining a deformation includes an annular ring having an internal diameter at least less than the external diameter of said tubing, said annular ring embracing said tubing thereby constricting the internal cross sectional area of said tubing to define said valve seat.

3. The device defined in claim 1, wherein said means defining a deformation includes a first ring embracing said tubing and effecting a first constriction in said tubing and wherein said limit means includes a second ring embracing said tubing and spaced from said first ring and effecting a second constriction in said tubing and a spring seated against said second constriction and bearing against said valve unit for normally urging same against said valve seat.

4. In a check valve construction, the combination comprising:
   an elongated deformable tubular member;
   removable clamping means externally engaging said tubular member providing a deformation on the interior thereof, said deformation defining a valve seat;
   a valve unit cooperable with said seat;
   limit means spaced a predetermined distance from said deformation opposing opposite movements of said unit.

5. The device defined in claim 1, wherein said tubing is of elastomeric material and wherein externally applied contracting means on said tubing provides said deformation.

6. The device defined in claim 1, including an external shell connected to and telescoping said tubing and extending between said deformation and said limit means.

7. The device defined in claim 3 including a shell externally telescoping and connecting said spaced rings.

References Cited

UNITED STATES PATENTS

| | | | |
|---|---|---|---|
| 1,051,004 | 1/1913 | Pfeiffer | 49—90 |
| 2,074,195 | 3/1937 | Uphoff | 137—539 X |
| 2,617,624 | 11/1952 | Annis | 137—223 |
| 2,692,751 | 10/1954 | Felver | 251—342 |
| 2,855,127 | 10/1958 | Lerner et al. | 137—533.11 X |
| 2,862,497 | 12/1958 | Pagano | 251—342 X |
| 2,999,499 | 9/1961 | Willet | 251—342 X |
| 3,181,555 | 5/1965 | Jacobson | 251—351 X |

FOREIGN PATENTS 819,117   7/1937   France.

WILLIAM F. O'DEA, *Primary Examiner.*

D. LAMBERT, *Assistant Examiner.*